United States Patent [19]

Coates

[11] Patent Number: 4,754,493

[45] Date of Patent: Jun. 28, 1988

[54] AUTOMATIC RECOGNITION AND GUIDANCE ARRANGEMENTS

[75] Inventor: Philip V. Coates, Sunbury-on-Thames, England

[73] Assignee: EMI Limited, Hayes, England

[21] Appl. No.: 910,467

[22] Filed: May 24, 1978

[30] Foreign Application Priority Data

May 25, 1977 [GB] United Kingdom ................. 7722026

[51] Int. Cl.$^4$ .............................................. G06K 9/20
[52] U.S. Cl. ......................................... 382/48; 382/30
[58] Field of Search .............. 340/146.3 Q, 146.3 AH; 343/5 MM; 364/456; 244/3.17; 382/48, 30

[56] References Cited

U.S. PATENT DOCUMENTS

| | | | |
|---|---|---|---|
| 3,416,752 | 12/1968 | Hembree | 244/3.17 |
| 3,727,183 | 4/1973 | Le May | 340/146.3 Q |
| 3,737,120 | 6/1973 | Green | 343/5 MM |
| 3,898,617 | 8/1975 | Kashioka et al. | 340/146.3 AH |
| 3,952,299 | 4/1976 | Hodge et al. | 340/146.3 Q |
| 3,986,682 | 10/1976 | Dryden | 343/5 MM |
| 4,091,394 | 5/1978 | Kashioka et al. | 340/146.3 Q |
| 4,136,332 | 1/1979 | Kadota et al. | 340/146.3 Q |

OTHER PUBLICATIONS

Aleksander et al.—"Adaptive Logic for Artificially Intellegent Systems", *Radio and Electronic Engineer*, vol. 44, No. 1, Jan. 1974.

Wilson et al.—"Pattern-Recognition Properties of RAM/ROM Arrays", *Electronics Letters*, vol. 13, No. 9, Apr. 1977.

*Primary Examiner*—Theodore M. Blum
*Attorney, Agent, or Firm*—Fleit, Jacobson, Cohn & Price

[57] ABSTRACT

A set of stores contains reference information representing a reference pattern. A scene is scanned and information derived from each of a succession of portions of the scene is fed to the stores which produce correlation signals if the scene information of that portion correlates with the reference information.

The position of the portion of the scene which is fed to the stores is tracked, and the position associated with the highest correlation score is used as a representation of the position in the scene of the reference pattern.

9 Claims, 5 Drawing Sheets

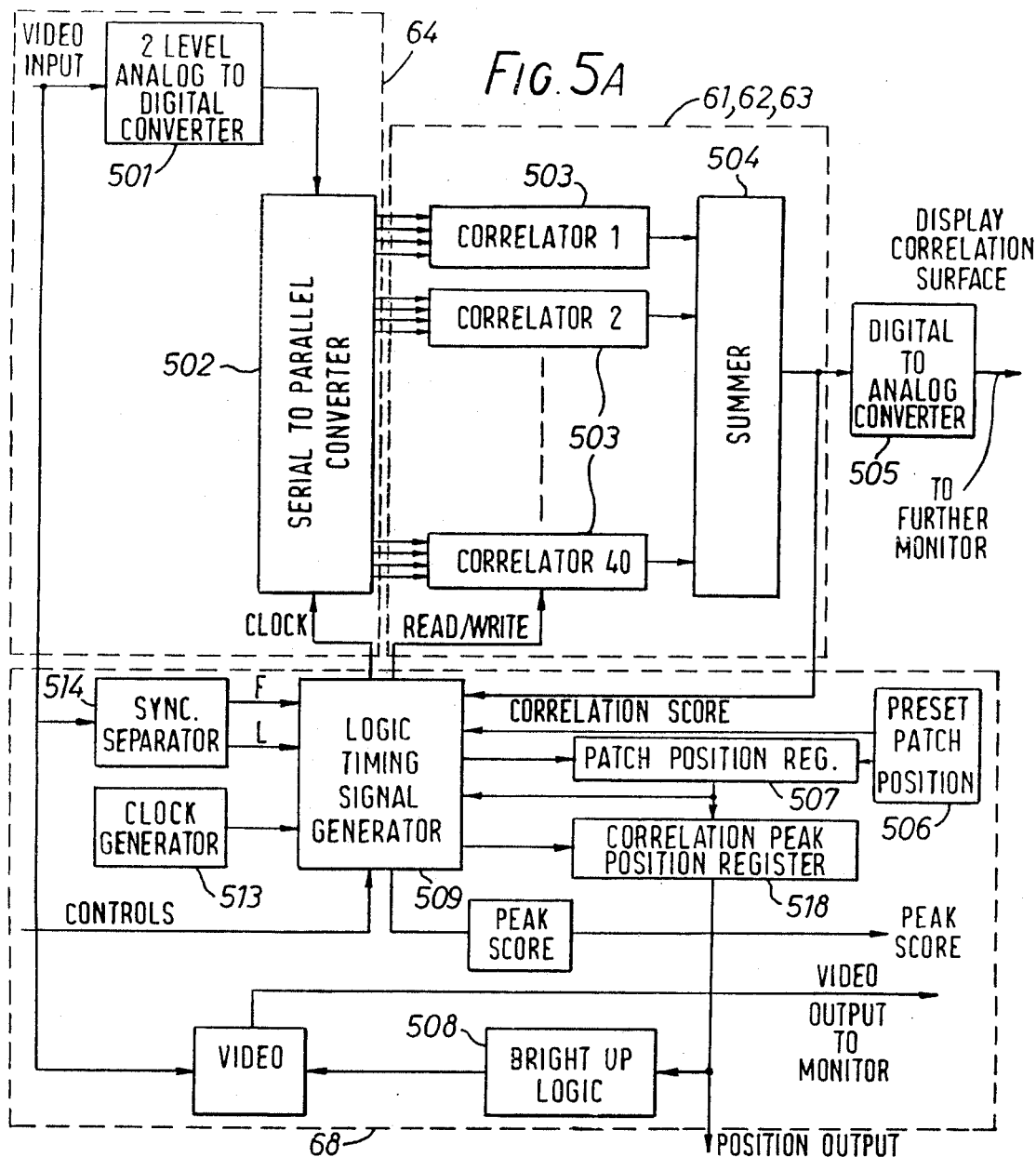

AUTOMATIC RECOGNITION AND GUIDANCE ARRANGEMENTS

The present invention relates to apparatus for producing a signal representing the position of a reference pattern in a pattern field.

It is known to use stores in the form of random-access-memories (RAMs) as trainable logic devices in arrays whose object is to recognise patterns. This is described in "Electronics Letters 28th Apr., 1977 Vol. 13, No. 9 in a letter by Wilson and I. Aleksander. The use of RAMs for pattern recognition is also described in an article by Aleksander, Stonham and Wilson entitled "Adaptive logic for artificially intelligent systems" in "The Radio and Electronic Engineer," Vol. 44, No. 1, January 1974.

It is an object of the present invention to use stores as corelators in apparatus for producing a signal representing the position of a reference pattern in a pattern field.

According to one aspect of the invention, there is provided apparatus for producing a signal representing the position of a reference pattern in a pattern field, the apparatus comprising, a plurality of correlator stores each having a plurality of storage locations for storing respective pieces of data, address inputs for receiving address signals defining addresses for selecting the locations, and an output for producing data stored at any of the locations selected by the address signals, the stores being adapted to store respective pieces of data of predetermined value at locations having reference addresses defined in a predetermined pattern, means for successively presenting to the address inputs of the correlator stores sets of address signals defining addresses defined in the said predetermined manner by successive portions of the pattern field, respective ones of the address signals of each set being presented to the address inputs simultaneously to produce at the said outputs the data stored at the locations selected by the addresses, means coupled to the said outputs to produce correlation scores indicative of the amount of predetermined data selected by the addresses, means for indicating the position relative to the pattern field of the portion of the pattern field defining the addresses presented to the correlator stores, and means for determining the position indicated by the indicating means which is associated with the best correlation score produced by the correlation score producing means and for producing from the determination the said signal representing the position of the reference pattern in the pattern field.

According to another aspect, there is provided apparatus for producing a signal representing the position, relative to a pattern field of a reference pattern, the apparatus comprising:

a plurality of sets of correlator stores for storing reference information representing respective reference patterns, each store having a plurality of inputs and an output and being operable to produce a correlation signal at its output if information presented to the inputs correlates with the reference information stored in the store, means for successively presenting information representing successive portions of the pattern field to the sets, respective pieces of information being simultaneously presented to the inputs of the correlator stores, means connected to the outputs of the stores for producing correlation scores which are differently weighted for each set, the scores indicating the correlation between information presented to the sets and the reference information stored in them, means for indicating the position relative to the pattern field of the portion of the pattern field being presented to the sets of correlator stores, and means for determining the position indicated by the indicating means which is associated with the highest of the weighted correlation scores produced by the score producing means and for producing from that determination a signal representing the position relative to the pattern field of that reference pattern stored in the set causing the production of the highest of the weighted correlation scores.

For a better understanding of the present invention, reference will now be made, by way of example, to the accompanying drawings, in which:

FIG. 5A is a block diagram of the exemplary embodiment;

Figure 1:
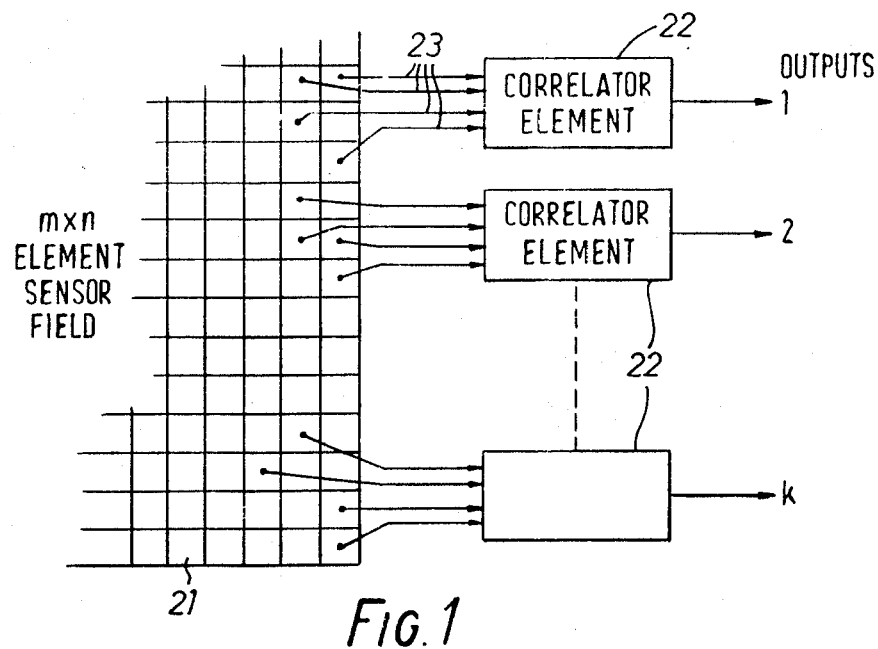
FIGS. 1 and 2 are for explaining the operation of a random access memory (RAM) as used in an exemplary embodiment of the invention.

Referring now to FIG. 1 there is shown a sensory field or array 21 of $n \times m$ pixels, to which are connected k correlator elements 22, whose operation is yet to be defined. The organisation is such that each correlator element has four inputs 23, each of which is connected to one of the pixels in the array. Thus the number of correlator elements $k = n \times m/4$. Each of the pixels in the sensory array can have one of two binary values 0 or 1. Consider the operation of one of the correlator elements when a reference pattern is applied to the array. Its input will have a four bit binary number consisting of the outputs of the four pixels to which it is connected. It is required to "remember" this number such that when it is subsequently applied at its input, it responds with a 1 at its output, and other four bit number at the input giving rise to a 0 at its output.

The operation described in the immediately preceding paragraph can be obtained from a standard proprietary semiconductor Random Access Memory (RAM) by using it in a configuration which constitutes part of this invention and is described in more detail below.

Figure 2:
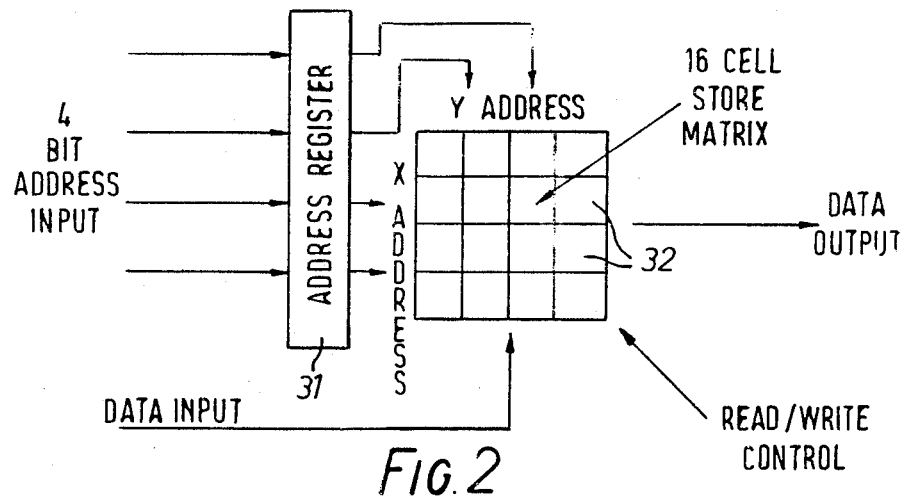

FIG. 2 shows a schematic of a typical RAM, having an address register 31 and 16 store ceels 32. A four bit binary number presented at the address input defines a unique location within the sixteen store cells. Depending upon the state of the read/write control, line data can either be written into or extracted from that store cell; (reading data from a RAM is normally non destructive).

To use the RAM as a correlator element it is necessary to apply the data to its address inputs and hold the data input at a fixed binary 1 level. In operation, the RAM is first cleared to all 0's then, when a reference pattern is applied, the RAM is instructed to write. This results in a 1 being written into the location defined by the four bit binary number at the address inputs. In subsequent operations the RAM is instructed to read. In the read mode only the application of the correct four bit number at the address input will result in a 1 at the output; all other addresses access empty store locations in the RAM.

Figure 3:
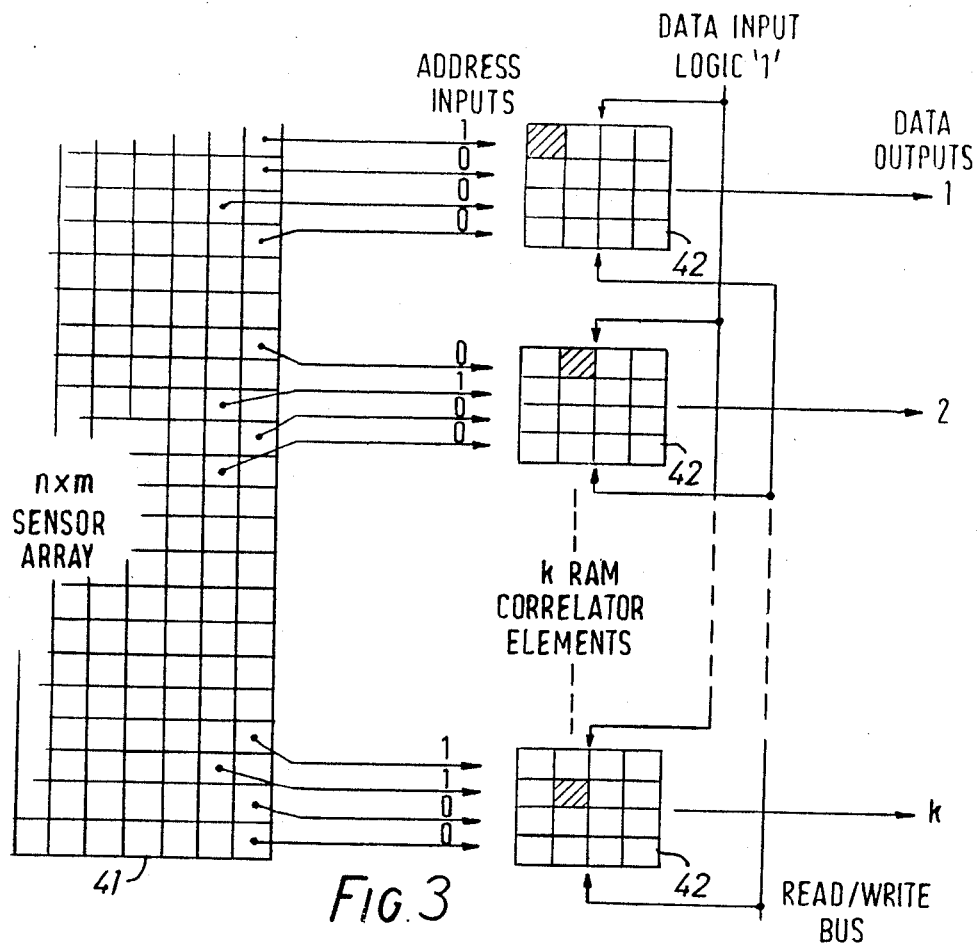
FIG. 3 shows an array of RAMs as used in the embodiment.

Thus a readily available device can be used as a correlator element, and the system shown in FIG. 1 csn be implemented using k RAM's. This is shown in FIG. 3. A reference pattern of 0's and 1's is presented to an n×m sensory array 41 which gives rise to sets of four bit numbers at the address inputs to the RAM correlator elements 42. The RAM's are instructed to write a logic 1 level. Each of them writes a logic 1 level (shown shaded) into the address location dictated by the reference pattern. The RAM's are then instructed to read. Now, if an applied test pattern of 0's and 1's is the same as the original reference, then all the RAM's will read out logic 1 levels. The total count at the correlator outputs will be k. If the test pattern differs from the reference pattern, then a count less than k will be obtained. The magnitude of the total count will be a measure of the similarity between the test pattern and the reference pattern.

Only one reference pattern has been considered, although with the organisation depicted this only uses 1/16 of the available storage. If a second reference pattern is written into the system depicted in FIG. 3, then two of the 16 storage locations, in each correlator, will have a logic 1 located in them. In this case the maximum correlation score, k, will be obtained for a subsequent input of either pattern. This clearly cannot be taken too far, since eventually all 16 cells would have logic 1's in them and the correlator would be too "general" in operation, scoring maximum for all input patterns. However, other organisations are possible for instance, 256×1 RAM's are available, which have eight address lines and could accommodate a large number of reference patterns before generalization became significant.

A system has been constructed to identify and track patterns similar to a previously seen reference pattern.

The system employs a correlator consisting of forty RAM's each having four address inputs, covering a field of 160 pixels. These are organised in the form of a 16×10 patch, which in operation is scanned over the whole of a 625 line t.v. format field. Since the correlator is organised in parallel format, it can produce a correlation score for the 160 pixels in the access time of one single RAM (Typically 30–50 ns). Thus it is possible to arrange the patch to conduct a continuous search over the whole t.v. field at the input video rate (10 M HZ). Further, since the correlator produces correlation scores at video data rate, these scores can be converted to analogue form and displayed directly on a t.v. monitor. This enables the whole correlation surface to be observed in real time.

Figure 4:
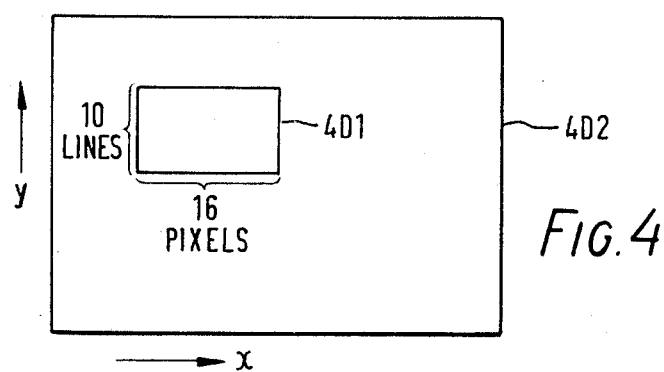
FIG. 4 is for explaining the manner of operation of the embodiment.
Figure 5B:
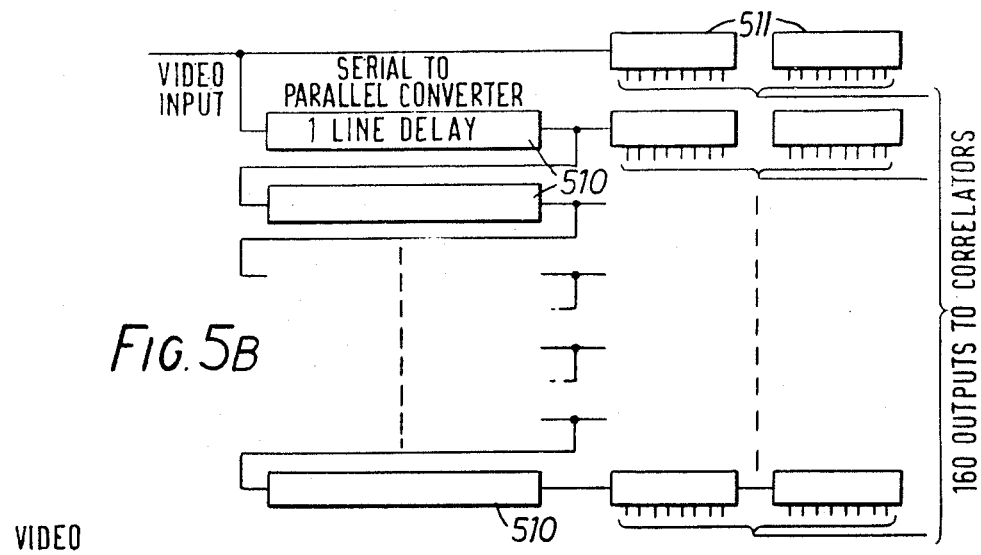
FIG. 5B and 5C are detailed block diagram of parts of the embodiment of FIG. 5A.

A block diagram of the system is shown in FIGS. 4, 5A, 5B and 5C. Referring to FIGS. 4 and 5A, a t.v. camera (for example) produces video information which is fed to a first t.v. monitor to display that information. Referring to FIG. 5A, the input video information from the t.v. camera is digitized to two levels in a converter 501 and the resultant stream of digits presented to a serial-to-parallel converter 502. Referring to FIG. 4, the converter stores the pixels of a 10 line by 16 pixel rectangle 4D1 of pixels and presents all 160 pixels in parallel to 40 correlators 503 each of which has four inputs. The pixels in the converter change at the video rate so, in effect, the 10×16 rectangle 4D1 scans the whole video field 4D2 at the video rate. The correlators are followed by a digital summer 504 which totals the correlation score (between 0 and 40). (The output of this summer may be converted to analogue form in a converter 505 and presented on another t.v. monitor display synchronized to the input video signal.)

In order to designate an object or target to be tracked a bright rectangle is also displayed on the first monitor; the rectangle surrounds a reference patch 10 lines high by 16 pixels wide. The position of the patch is adjusted until it bounds the object to be tracked using a means 506 which writes desired coordinates for the patch into a patch position register 507. The desired coordinates are fed from the register 507 to bright-up logic 508 which causes the necessary video output to be fed to the monitor to display the bright rectangle. The correlator RAMs are caused to store the video information within the reference patch by the means 506 acting on a timing signal generator 509 which puts the correlators into the write mode when the scanning rectangle 4D1 coincides with the reference patch. The correlators are then put into the read mode. Subsequent fields of incoming video are scanned by the 10×16 scanning rectangle and at each point a correlation score representing the correlation between the information in the rectangle and the reference patch is produced. This is a measure of the match at each point in the current scene with the stored reference. The logic generator 509 keeps the peak position register 518 loaded with the patch position at the maximum correlation score and the bright up logic 508 keeps the rectangle on the position of best score.

Figure 5C:
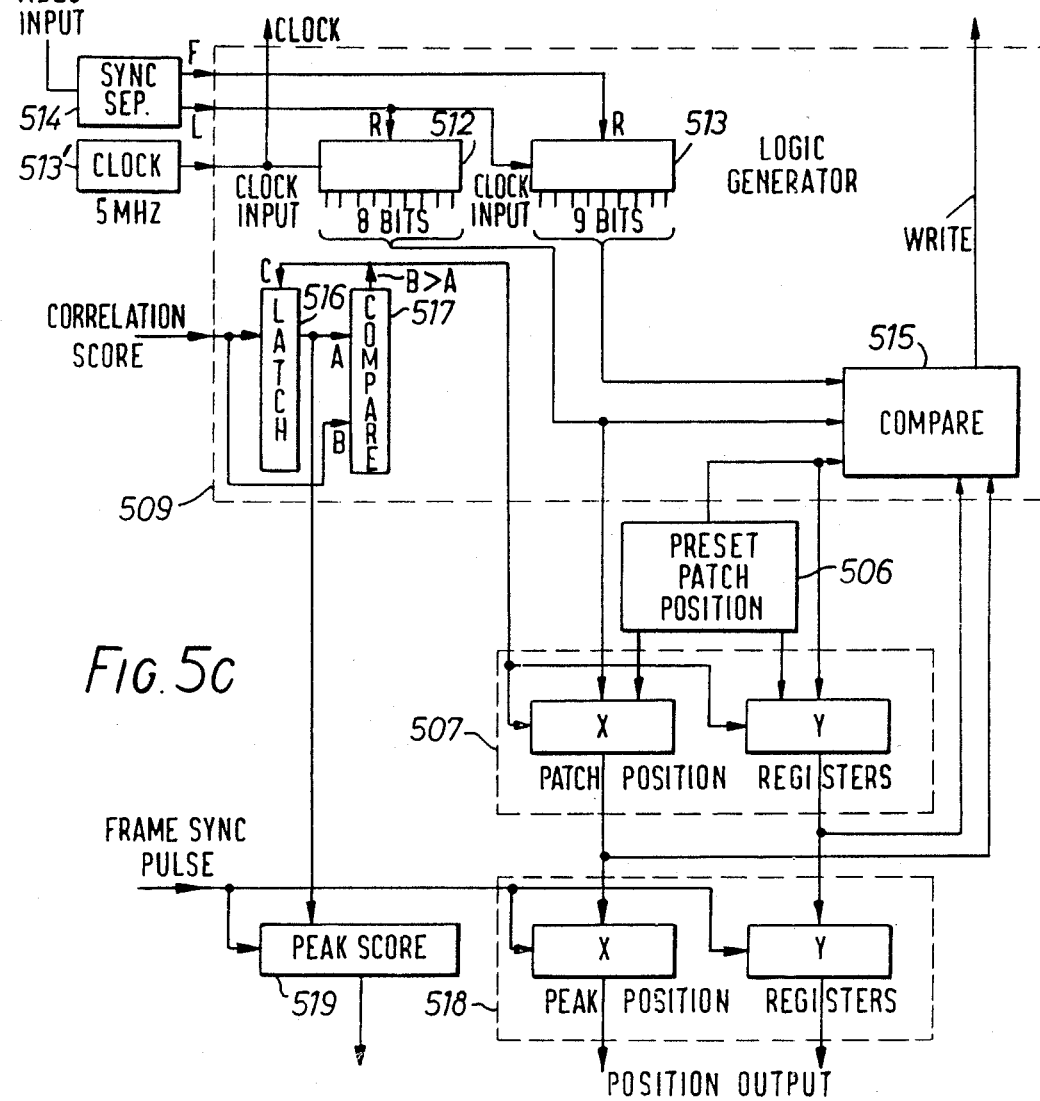

The serial to parallel converter 502 and the logic timing signal generator 509 are shown in more detail in FIGS. 5B and 5C.

Referring to FIG. 5B, the converter comprises 9 one-line-delays 510, each of which is a 256 bit shift register, and ten 16 bit stores, each of which is a pair 511 of 8 bit shift registers. One of the 16 bit stores 511 is connected directly to the video input, the other 9 stores 511 are connected to the outputs of respective ones of the delays 510 which are connected as shown in FIG. 5B. Each delay 510 delays by one t.v. line time. The shift registers are clocked at the video rate. Thus at the outputs of the 16 bits stores there are simultaneously produced the 160 pixels of the 10×16 scanning rectangle.

The logic timing signal generator 509 is shown in FIG. 5C. It comprises an 8 bit counter 512 and a 9 bit shift register 513 for tracking the position of the scanning rectangle 5D1. The register 512 is clocked by a clock 513 to keep track of the position of the rectangle 4D1 in the line direction X (FIG. 4) and is reset at the end of every line by a line sync pulse derived from the video input by a sync separator 514. The register 513 is clocked by the line sync pulse to keep track of the position of the rectangle 4D1 in the frame direction Y (FIG. 4) and is reset at the end of every field by a frame sync pulse produced by the sync. separator 514.

When a target is being designated, the desired X, Y coordinates of the reference patch are fed by the preset patch position means 506 into the patch position registers 507. The generator 509 comprises a comparator 515 which compares the coordinates in the patch position registers 507 with the coordinates in the tracking registers 512, 513, and when they are equal produces a write pulse for causing the information in the reference patch to be stored in the correlators 503.

When a target has been designated the correlators are put into the read mode. In this mode correlation scores are fed at the video rate to a latch 516 and to another comparator 517 of the generator 509. The latch 516 stores a score A and the comparator 517 compares that score with the next score B to be produced. If the score B is greater than A the comparator produces a clock pulse C which causes the latch to store score B. The pulses C also causes the patch position registers to store the position of the scanning rectangle at the time of production of score B. In this way latch C contains the highest current score and the patch position register contain the coordinates of that score.

At the end of each field a frame sync pulse is fed to peak position registers 518 to cause them to store the coordinates of the highest correlation score. The output of the peak position registers is used to control the bright up logic 508 so if the target moves in successive fields, the bright rectangle will follow the target. The output is also used to control a guidance servo (not shown) if the system is used in a vehicle or machine which is to follow the target.

The frame sync pulse may also be fed to a peak score register 519 if desired, to output the peak score at the end of every field.

The system can lock on to, and track, targets even in the presence of reasonable levels of video noise. Its speed of operation enables it to follow targets moving rapidly through the field of view. An improvement in performance can be obtained by using eight input correlators.

The peak correlation score may fall, due to the object being tracked changing aspect or magnification, and so provision may be made to write a new reference pattern into the correlators located at the last position of best match. This would be inhibited if the correlation peak falls too low.

One technique of performing limited pattern recognition is the technique of "template matching". This requires a store of pattern "templates" and a correlator to measure the degree of match between the templates and the test pattern. Obviously some prior knowledge of the object to be recognised is essential to the generation of the templates. One major problem with this approach to pattern recognition is that an object can be viewed from an infinite number of positions, and at each of these positions it will present a slightly different appearance. It if is required to recognise the object from any of these positions then an infinite number of templates will be required. The fact that small separations in the observer's position will not greatly affect the appearance can be used to reduce the number of templates to some finite value. However, this is still likely to be quite large.

In practice it is necessary to compare, point by point, each of the template patterns with a patch on the input field. This must then be repeated for every possible position of the patch in the field, to find out if the desired object is in the field of view. Using standard correlation techniques this would involve a prohibitively large number of operations.

However a system as shown in FIG. 5A could be used for performing limited pattern recognition if the correlators 503 had e.g. eight inputs (or perhaps more than eight inputs). An eight-input correlator as shown in FIG. 5A has potential capacity for 256 unique patterns or templates. Of these, say 100 templates could be used before significant degradation in performance due to over generalisation occurs. The nature of such a network is such that, within the correlator element access time (typically 100 ns) a correlation score is produced which is the best match between the applied test pattern and the closest combination of the 100 reference patterns.

Figure 6:
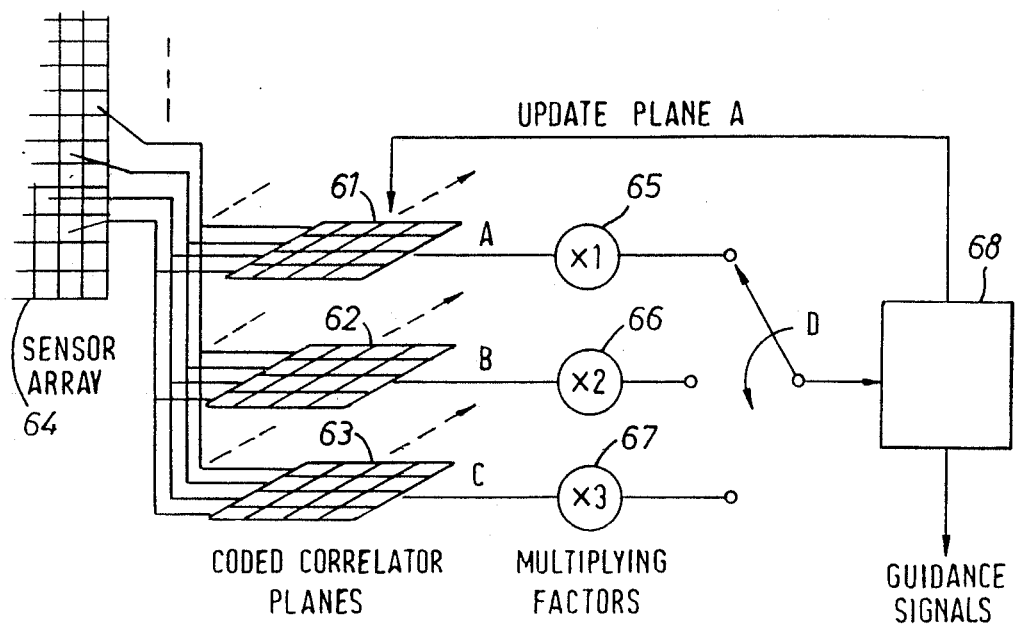
FIG. 6 is a schematic diagrams of a modification of the embodiment of FIG. 5A.

Apparatus for performing another pattern recognition technique is shown schematically in FIG. 6. In that Figure three separate networks of correlators 61, 62, 63 (shown as planes) are connected, in parallel, to an array 64 of sensor pixels. Referring to FIG. 5A the array 64 corresponds to block 64 in FIG. 5A, and the correlator networks 61, 62, 63 each correspond to block 61, 62, 63 in that Figure. Each of the three correlator planes operates independently of the others and produces a correlation score which can have a maximum value equal to the number of correlator elements. each plane has the same number of elements, hence the outputs A, B and C have the same range. Each plane, however has a multiplier 65, 66, 67 attached to it such that at the logic block 68 (corresponding to block 68 in FIG. 5A) plane B can score a maximum value twice that of A and C three times that of A.

Consider an applications involving the equipment approaching a target or group of targets. Plane A operates as an updated system arranged to automatically home in on the target or group of targets. In such a system new patterns are periodically written into the correlators using the means 506 of FIG. 5A. The new patterns are derived from the input video information. The means 506 may be periodically operated manually or automatically in known manner to perform the updating. Planes B and C have reference patterns permanently written into them identifying specific targets or points within a target. In the initial part of the approach plane A is operating and producing high correlation values. The image may not contain sufficient detail for the other planes to identify with their reference patterns. Switch D is sequentially scanning the outputs of the planes and selecting the maximum score on which to lock. As the group of targets approaches, so the images become more detailed until, say, plane B matches one part of the image with a reference pattern. Since the B plane output is multiplied by two, it will "take over" control, homing in on its pre-programmed pattern.

The multiplying factor establishes a priority on the pattern planes; if no pre-programmed patterns are located, then the plane A continues as best it can.

For simplicity, the description of FIGS. 1 to 6 hereinbefore has related to a simple two-level grey scale arrangement. However, a three-bit (eight grey level) correlator arrangement could be used. This can be achieved, for example, by paralleling the correlator elements, one for each of the required bits in the digital word. In this case, the overall speed of operation is not affected by the size of the word used.

One feature of arrangement in accordance with the invention is that, because large numbers of similar or identical components are used, the arrangement is amenable to volume compression by large scale integration techniques.

What I claim is:

1. Apparatus for producing a signal representing the position of a reference pattern in a pattern field, the apparatus comprising,
   a plurality of correlator stores each having a plurality of storage locations for storing respective pieces of data address inputs for receiving address signals defining addresses for selecting the locations, and an output for producing data stored at any of the locations selected by the address signals, the stores being adapted to store respective pieces of data of predetermined value at locations having reference addresses defined in a predetermined manner by the reference pattern, means for successively presenting to the address inputs of the correlator stores sets of address signals defining addresses defined in the said predetermined manner by successive portions of the pattern field, respective ones of the address signals of each set being presented to the address inputs simultaneously to produce at the said outputs the data stored at the locations selected by the addresses, means coupled to the said outputs to produce correlation scores indicative of the amount of predetermined data selected by the addresses, means for indicating the position relative to the pattern field of the portion of the pattern field defining the addresses presented to the correlator stores, and means for determining the position indicated by the indicating means which is associated with the best correlation score produced by the correlation score producing means and for producing from the determination the said signal representing the position of the reference pattern in the pattern field.

2. Apparatus according to claim 1, wherein each correlator store comprises a semi-conductor random access memory device.

3. Apparatus according to claim 1 wherein the correlation score producing means comprises a summing circuit for summing pieces of predetermined data produced by the correlator stores.

4. Apparatus according to claim 1, wherein the presenting means includes a serial to parallel converter for receiving information representing the pattern field in serial form and for presenting pieces of the information representing each portion simultaneously to the inputs of the correlator stores.

5. Apparatus according to claim 4, wherein the converter comprises a series arrangement of a plurality of delay means for receiving the information representing the pattern field in serial form, and a plurality of stores connected to respective ones of the delay means to receive pieces of information from the delay means in serial form and for feeding these pieces of information to the correlator stores in parallel form.

6. Apparatus according to claim 1, wherein the position determining means includes means for storing a correlation score, means for comparing the stored score with succeeding correlation scores and for causing the storing means to store the larger of the compared scores, and means responsive to the comparing means for storing the position, indicated by the position indicating means, associated with the larger of the compared scores.

7. Apparatus according to claim 1, further comprising means for producing reference addresses for writing the data of predetermined value into the correlator stores.

8. Apparatus according to claim 7, wherein the writing means includes means for selecting a desired position in the pattern field, and means for comparing the desired position with the position indicated by the position indicating means to cause the correlator stores to store the data of predetermined value at the addresses presented to them, at the time the desired position is the same as the indicated position, by the presenting means.

9. Apparatus for producing a signal representing the position, relative to a pattern field, of a reference pattern, the apparatus comprising:

a plurality of sets of correlator stores for storing reference information representing respective reference patterns, each store having a plurality of inputs and an output and being operable to produce a correlation signal at its output if information presented to the inputs correlates with the reference information stored in the store, means for successively presenting information representing successive portions of the pattern field to the sets, respective pieces of information being simultaneously presented to the inputs of the correlator stores, means connected to the outputs of the stores for producing correlation scores which are differently weighted for each set, the scores indicating the correlation between information presented to the sets and the reference information stores in them, means for indicating the position relative to the pattern field of the portion of the pattern field being presented to the sets of correlator stores, and means for determining the position indicated by the indicating means which is associated with the highest of the weighted correlation scores produced by the score producing means and for producing from the determination a signal representing the position relative to the pattern field of that reference pattern stored in the set causing the production of the highest of the weighted correlation scores.

* * * * *